United States Patent
Berens et al.

(10) Patent No.: US 7,099,377 B2
(45) Date of Patent: Aug. 29, 2006

(54) METHOD AND DEVICE FOR INTERFERENCE CANCELLATION IN A CDMA WIRELESS COMMUNICATION SYSTEM

(75) Inventors: Friedbert Berens, Geneve (CH); Timo Roman, Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 819 days.

(21) Appl. No.: 10/116,760

(22) Filed: Apr. 3, 2002

(65) Prior Publication Data

US 2003/0189972 A1  Oct. 9, 2003

(51) Int. Cl.
*H04B 1/69* (2006.01)

(52) U.S. Cl. ............ 375/148; 375/346; 375/147; 375/144; 375/150; 375/200; 375/210; 375/349; 370/342; 370/352; 370/335; 704/500

(58) Field of Classification Search ............ 375/148, 375/346, 147, 144, 150, 200, 210, 349, 350; 370/342, 352, 335; 704/500
See application file for complete search history.

(56) References Cited

U.S. PATENT DOCUMENTS

| | | | |
|---|---|---|---|
| 5,615,209 A * | 3/1997 | Bottomley | 370/342 |
| 6,442,193 B1 * | 8/2002 | Hirsch | 375/147 |
| 6,445,692 B1 * | 9/2002 | Tsatsanis | 370/342 |
| 6,504,838 B1 * | 1/2003 | Kwan | 370/352 |
| 6,574,270 B1 * | 6/2003 | Madkour et al. | 375/148 |
| 6,711,219 B1 * | 3/2004 | Thomas et al. | 375/346 |
| 6,947,470 B1 * | 9/2005 | Berens | 375/144 |
| 6,947,474 B1 * | 9/2005 | Kober et al. | 375/148 |
| 2002/0065664 A1 * | 5/2002 | Witzgall et al. | 704/500 |
| 2004/0190603 A1 * | 9/2004 | Dabak et al. | 375/148 |
| 2005/0180364 A1 * | 8/2005 | Nagarajan et al. | 370/335 |

FOREIGN PATENT DOCUMENTS

EP  1 175 019 A1  1/2002

* cited by examiner

*Primary Examiner*—Emmanuel Bayard
*Assistant Examiner*—Sudhanshu C. Pathak
(74) *Attorney, Agent, or Firm*—Lisa K. Jorgenson; Stephen Bongini; Fleit, Kain, Gibbons, Gutman, Bongini & Bianco P.L.

(57) ABSTRACT

The method of interference cancellation in a CDMA wireless communication system comprises receiving an incident digital signal containing a user signal transmitted on a CDMA user physical channel and an interfering signal, projecting said incident digital signal onto a projection space orthogonal to the space containing said interfering signal, filtering said projected signal with a filter matched to the CDMA user physical channel for detecting the data contained in said user signal.

23 Claims, 7 Drawing Sheets

PRIOR ART

PRIOR ART $$A_i = \begin{bmatrix} b_1^{(1)} & b_1^{(2)} & \cdots & b_1^{(K)} \\ b_2^{(1)} & b_2^{(2)} & & b_2^{(K)} \\ \vdots & \vdots & & \vdots \\ b_{Q+W-1}^{(1)} & b_{Q+W-1}^{(2)} & \cdots & b_{Q+W-1}^{(K)} \end{bmatrix}$$

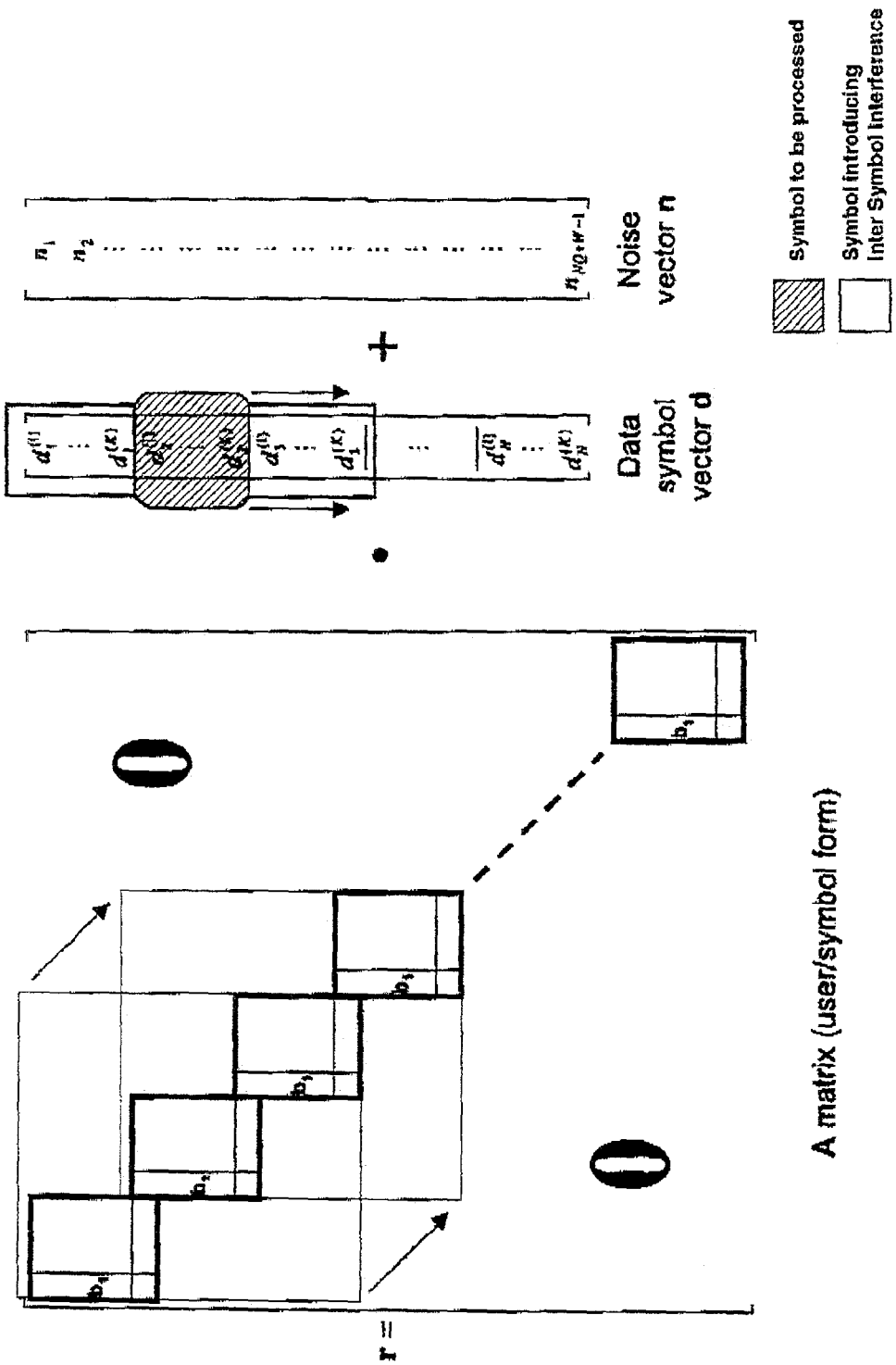

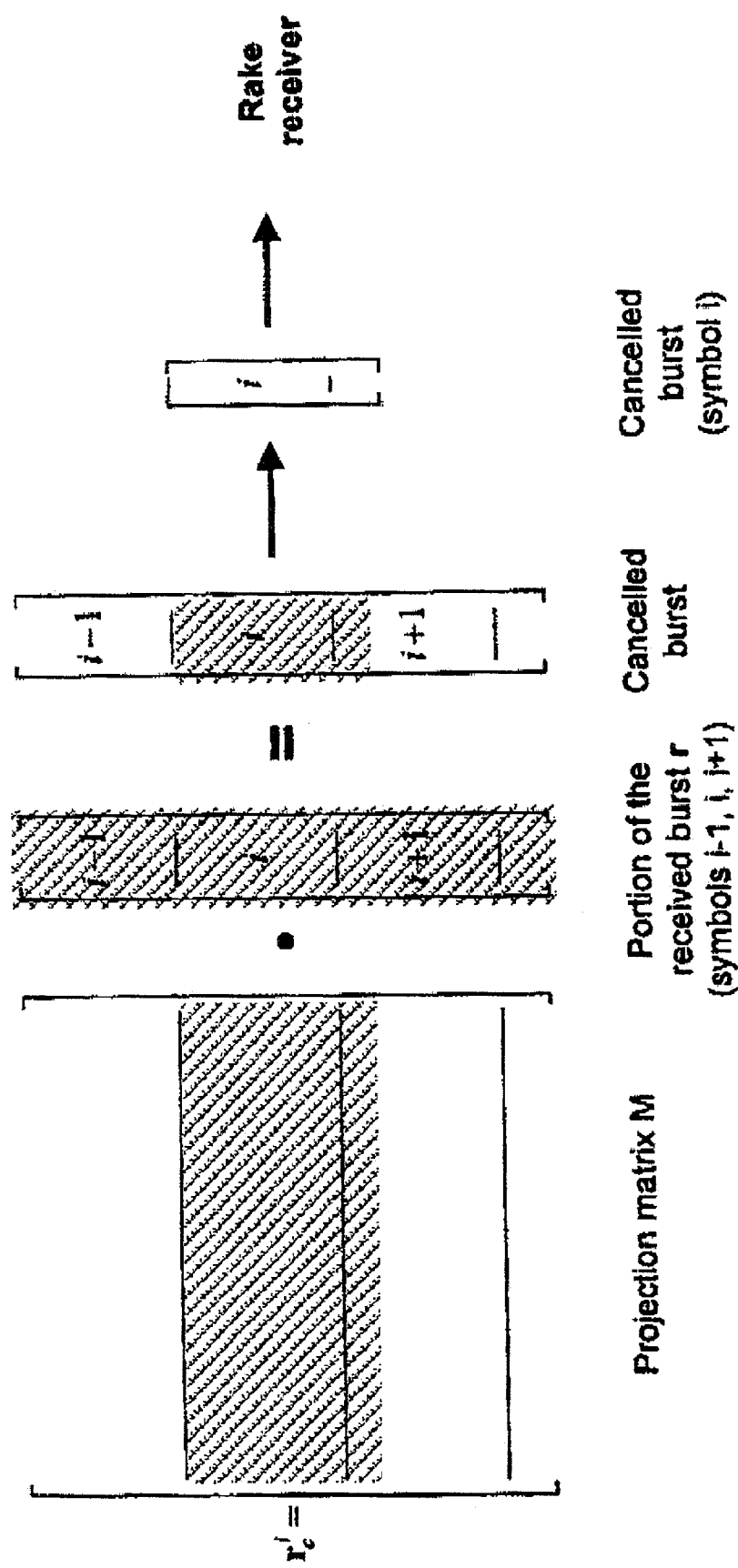

METHOD AND DEVICE FOR INTERFERENCE CANCELLATION IN A CDMA WIRELESS COMMUNICATION SYSTEM

FIELD OF THE INVENTION

The invention relates in general to the field of wireless communication systems, and more particularly to the CDMA systems such as the different CDMA based mobile radio systems like WCDMA (Wide Band CDMA) and more particularly UTRA-TDD in the downlink situation (UTRA-TDD: UMTS Terrestrial Radio Access—Time Division Duplex).

BACKGROUND OF THE INVENTION

In a wireless communication system, a central base station communicates with a plurality of remote terminals, such as cellular mobile phones. Frequency-Division Multiple Access (FDMA) and Time-Division Multiple Access (TDMA) are the traditional multiple access schemes to provide simultaneous services to a number of terminals. The basic idea behind FDMA and TDMA technics is to slice the available resource into multiple frequency or time slots, respectively, so that multiple terminals can be accomodated without causing interference.

Contrasting these schemes with separate signals in frequency or time domains, Code-Division Multiple Access (CDMA) allows multiple users to share a common frequency and time channel by using coded modulation.

More precisely, as it is well-known by the man skilled in the art, a scrambling code which is a long pseudo noise code sequence, is associated with each base station and permits to distinguish the base stations from each other. Further, an orthogonal code, known by the man skilled in the art under the denomination of OVSF code, is allocated to each remote terminal (such as cellular mobile phone). All these OVSF codes are orthogonal with each other, which permits to distinguish a remote terminal from another.

Before emitting a signal on the wireless transmission channel towards a remote terminal, the signal has been scrambled and spread by the base station using the scrambling code of the base station and the OVSF code of the remote terminal.

Because of possible reflections of the initial transmitted signal on obstacles between the base station and the remote terminal, the wireless transmission channel is in fact a multipath transmission channel. As a result, the signal which is received by remote terminal includes different time shifted versions of the initial transmitted signal which are the results of the multipath transmission characteristics of the mobile radio channel. Each path introduces a different time delay.

Among the CDMA systems, the CDMA-FDD systems use a different frequency for emission and for reception (FDD: Frequency Division Duplex), whereas the CDMA-TDD systems use a common frequency for emission and reception, but different time domains for emission and reception (TDD: Time Division Duplex).

The main problem arising from the use of CDMA is the Multiple Access Interference (MAI) from the users in the cell and the Inter Cell Interference (ICI) coming from other cells.

In recent years, multiuser detection has gained significant notoriety as a potential advanced technology for the next generation of CDMA systems. The poor code cross-correlation properties induced by the short spreading lengths in WCDMA/TDD) lead to severe degradations when several users are transmitting simultaneously, and the conventional correlation receiver appears to be limited. To overcome this major drawback, several advanced receiver structures have been proposed.

Unlike the conventional receiver, which treats multiple access interference (MAI) as if it were Additive White Gaussian Noise, multiuser receivers treat MAI as additional information to aid in detection. Interference cancellation (IC) is one of several multiuser detection (MUD) methods to suppress the effects from the MAI and consequently improve the resulting performance. This in return will increase the capacity of the communication system.

Interference cancellation at the mobile terminal is beneficial to perform at high data rates that will be supported by multicode transmission. Because of multipath propagation, the mobile will experience multicode interference, from itself as well as from the other users. Applying a MUD technique to the downlink is extremely important since the system capacity is limited at the downlink. This is further enhanced by the higher traffic requirements in the downlink, the possibility of soft handoff, and the possibility of having antenna diversity.

Multiuser detection is probably one of the best reception techniques) as it removes efficiently the multiple access interference. Among this method, the so-called MMSE (Minimum Mean Square Error) joint detection, well-known by the man skilled in the art, can be cited.

However, the major drawback of these conventional multiuser detection methods lies in its high computational complexity involved by huge matrix inversions. This extra complexity is not desired at the terminal units, which possess limited battery life and processing capabilities. Furthermore, such conventional methods assume the knowledge of the spreading codes of the interfering users. However, this information is not always available.

SUMMARY OF THE INVENTION

The invention is intended to provide a solution to this problem.

One aim of the invention is to provide a blind interference cancellation without explicit detection of the interfering users.

Another aim of the invention is to offer a low complexity due to a sliding window technique.

According to the invention, a projection based approach has been chosen to reject the multiple access interference, or at least part of it. The received signal (at the chip level) is made of a useful part, i.e. the data of interest, and the data of other users, which causes interference, and the noise term.

The final aim is to reduce as much as possible the interfering part, without requiring the explicit detection of the corresponding data. The cancellation process is "blind" in that sense. For this purpose, the received signal is projected onto the orthogonal complement of the interfering signal space.

As a result, the projection operation entirely removes the interfering part from the received vector of chips. But it also subtracts part of the useful signal, since the useful and the interfering spaces are not orthogonal, due to multipath propagation. Nevertheless, it can be shown that this energy loss is largely compensated by the removed amount of multiple access interference.

More generally, the invention provides a method of interference cancellation in a CDMA wireless communication system, which comprises receiving an incident digital signal containing a user signal transmitted on a CDMA user physical channel and an interfering signal, projecting said incident digital signal onto a projection space orthogonal to the space containing said interfering signal, filtering said projected signal with a filter matched to the CDMA user physical channel for detecting the data contained in said user signal.

According to an embodiment of the invention, said interfering signal contains interfering information transmitted on at least one CDMA interfering physical channel; the data transmitted on each CDMA physical channel are sent burst by burst, each burst comprising N data symbols; channel coefficients and a specific code are allocated to each physical CDMA channel during each burst; the projecting phase comprises determining a burst interfering transmission matrix representative of said interfering signal space and containing information on channel coefficients and specific codes of all the CDMA interfering physical channels in use during said burst transmission, determining said projection matrix from said burst interfering transmission matrix, and multiplying said projection matrix with the N symbols of the received burst.

More particularly, determining said burst interfering transmission matrix comprises determining a burst transmission matrix containing information on channel coefficients and specific codes in use during said burst transmission, said burst transmission matrix comprising columns corresponding to said CDMA user physical channel, and remaining columns, and said remaining columns are the columns of said burst interfering transmission matrix.

The projection based approach is a powerful tool to perform interference cancellation. Exploiting the inner structure of the transmission matrix as well as the specificities of the downlink situation leads to major complexity reductions. Such improvements brought by the invention are based on the following facts:

1. The limited delay spread: generally TDD systems are adapted to operate in micro and pico-cellular environments (airports, offices). Such situations will rarely lead to delay spreads greater than 1 microsecond (i.e. 4 chips).

2. The downlink transmission scenario: the users' data are transmitted from the base station at the same time. Synchronization among users is automatically guaranteed though multipath is still present. Furthermore, for a given receiver, all the data streams from other users travel across the same wireless channel.

The above properties induce an almost block diagonal burst interference transmission matrix with periodically repeating blocks (depending on the spreading factor in use). An embodiment of the present invention exploits those specificities, with a sliding window approach, which considers only part of the burst interfering transmission matrix in order to perform the projection operation according to the invention.

More generally, said projecting and fitting phases can be done step by step during each reception of a burst at a rate which is equal to the symbol rate or an integer multiple thereof.

According to an embodiment of the invention, using the fact that the burst interference transmission matrix is a block matrix in the sense of the invention as explained more in details thereafter, at each current step,:
  a current sliding window of at least three consecutive blocks of the burst interference transmission matrix is used,
  one projection matrix is computed from said current sliding window of at least three consecutive blocks,
  a part of the received burst comprising at least three consecutive symbols is multiplied with said one projection matrix, and
  the corresponding projected part of the burst is filtered with said filter matched to the CDMA user physical channel.

Generally, the specific code allocated to a CDMA physical channel comprises a set of Q code symbols, Q being a spreading factor. The CDMA physical channels, multiplexed by the base station, are sent synchronously and travel accross a CDMA wireless channel which is a multipath channel introducing a delay spread which can be smaller than the smallest spreading factor. In such a case, the number of consecutive blocks may be equal to 3, which leads to a very low complexity.

However, if the delay spread is not smaller than the smallest spreading factor, more than three consecutive blocks, for example four, five or six, can be used leading however to more complexity, According to an embodiment of the invention, in which each computed block of the burst interference transmission matrix comprises a number of columns equal to the number of CDMA interfering physical channels within the burst, and a number of rows directly depending of the spreading factors Q of the CDMA interfering physical channels, said projecting phase and said filtering phase are done in N steps.

WCDMA/TDD makes use of the so-called OVSF (Orthogonal Variable Spreading Factor Codes) as channelisation codes. Their two main features are their perfect orthogonality, as well as the capability to support various data rates simultaneously. Those spreading codes are generated according to a hierarchical tree. Using codes at a higher level within the tree for cancellation purposes allows complexity reductions and also enables to suppress several interferers simultaneously.

In other words, according to an embodiment of the invention in which each specific code allocated to each CDMA interfering physical channel belongs to a code tree wherein each code, called parent code, at a given level within the tree is used to construct two child codes at the next level, each child code being obtained by the concatenation of its parent code, multiplied by +1 or −1, at least two CDMA interfering physical channels have specific codes associated with spreading factors and corresponding to a same parent code associated with a parent spreading factor PQ; each computed block of the burst interference transmission matrix comprises a number of columns smaller than the number of CDMA interfering physical channels within the burst, and a number of rows directly depending of said parent spreading factor, and said projecting phase and said filtering phase are done in pN steps, p being equal to Q/PQ.

The specific code is generally a combination of a spreading code and a scrambling code. When the respective length of the spreading code and the scrambling code are equal, each sliding window contains the same blocks.

However, when the length of the spreading code is smaller than the length of the scrambling code, at least two consecutive sliding windows contain different blocks. In other words, in such a case, this induces a periodically time varying spreading codes and blocks within the transmission matrix also alternate periodically.

The method according to the invention is advantageously used when the CDMA wireless communication system is an UTRA-TDD wireless communication system and when the incident signal is emitted by a base station, i.e. in the downlink situation.

The invention proposes also an interference cancellation device for a CDMA wireless communication system, comprising:
- reception means for receiving an incident digital signal containing a user signal transmitted on a CDMA user physical channel and an interfering signal,
- preprocessing means for projecting said incident digital signal onto a projection space orthogonal to the space containing said interfering signal, and
- a Rake receiver connected to the output of the preprocessing means, and matched to the CDMA user physical channel for detecting the data contained in said user signal.

According to an embodiment of the invention, said interfering signal contains interfering information transmitted on at least one CDMA interfering physical channel; the data transmitted on each CDMA physical channel are sent burst by burst, each burst comprising N data symbols; channel coefficients and a specific code are allocated to each physical CDMA channel during each burst; the preprocessing means comprises:
- first calculation means for determining a burst interfering transmission matrix representative of said interfering signal space and containing information on channel coefficients and specific codes of all the CDMA interfering physical channels in use during said burst transmission,
- second calculation means for determining said projection matrix from said burst interfering transmission matrix, and
- multiplication means for multiplying said projection matrix with the N symbols of the received burst.

According to an embodiment of the invention, said first calculation means comprises means for determining a burst transmission matrix containing information on channel coefficients and specific codes in use during said burst transmission, said burst transmission matrix comprising columns corresponding to said CDMA user physical channel, and remaining columns; said remaining columns are the columns of said burst interfering transmission matrix.

According to an embodiment of the invention, said preprocessing means and said Rake receiver are adapted to perform the projecting and filtering phases step by step during each reception of a burst at a rate which is equal to the symbol rate or an integer multiple thereof.

According to an embodiment of the invention, said burst interference transmission matrix is a block matrix, and at each current step:
- the preprocessing means is adapted for using a current sliding window of at least three consecutive blocks of the burst interference transmission matrix, for computing one projection matrix from said current sliding window of at least three consecutive blocks, for multiplying a part of the received burst comprising three consecutive symbols with said one projection matrix, and
- the Rake receiver is adapted for filtering the corresponding projected part of the burst.

According to an embodiment of the invention, the specific code allocated to a CDMA physical channel comprises a set of Q code symbols, Q being a spreading factor; the CDMA physical channels are sent across a CDMA wireless channel which is a multipath channel introducing a delay spread smaller than the smallest spreading factor, and the number of consecutive blocks is equal to three.

According to an embodiment of the invention, each computed block of the burst interference transmission matrix comprises a number of columns equal to the number of CDMA interfering physical channels within the burst, and a number of rows directly depending of the spreading factors Q of the CDMA interfering physical channels, and said preprocessing means and said Rake receiver are adapted to perform the projecting and filtering phases in N steps.

According to an embodiment of the invention, each specific code allocated to each CDMA interfering physical channel belongs to a code tree wherein each code, called parent code, at a given level within the tree is used to construct two child codes at the next level, each child code being obtained by the concatenation of its parent code, multiplied by +1 or −1; at least two CDMA interfering physical channels have specific codes associated with spreading factors and corresponding to a same parent code associated with a parent spreading factor PQ; each block of the burst interference transmission matrix comprises a number of columns smaller than the number of CDMA interfering physical channels within the burst, and a number of rows directly depending of said parent spreading factor; and said preprocessing means and said Rake receiver are adapted to perform the projecting and filtering phases in pN steps, p being equal to Q/PQ.

According to an embodiment of the invention, the specific code is the combination of a spreading code and a scrambling code; the respective lengths of the spreading code and the scrambling code are equal, and each sliding window contains the same blocks.

According to an embodiment of the invention, the specific code is the combination of a spreading code and a scrambling code; the length of the spreading code is smaller than the length of the scrambling code, and at least two consecutive sliding windows contain different blocks.

The invention proposes also a receiver, in particular a cellular mobile phone, of a CDMA wireless communication system, comprising an interference cancellation device as defined above.

The invention proposes also a base station of a CDMA wireless communication station comprising an interference cancellation device as defined above.

BRIEF DESCRIPTION OF THE DRAWINGS

Other advantages and features of the invention will appear in examining the detailed description of embodiments, these being in no way limited, and of the appendent drawings in which:

FIG. 10 illustrates a symbol by symbol approach according to the invention; and

FIG. 11 illustrates a symbol by symbol cancellation process according to the invention.

DETAILED DESCRIPTION OF PREFERRED EMBODIMENTS

Figure 1:
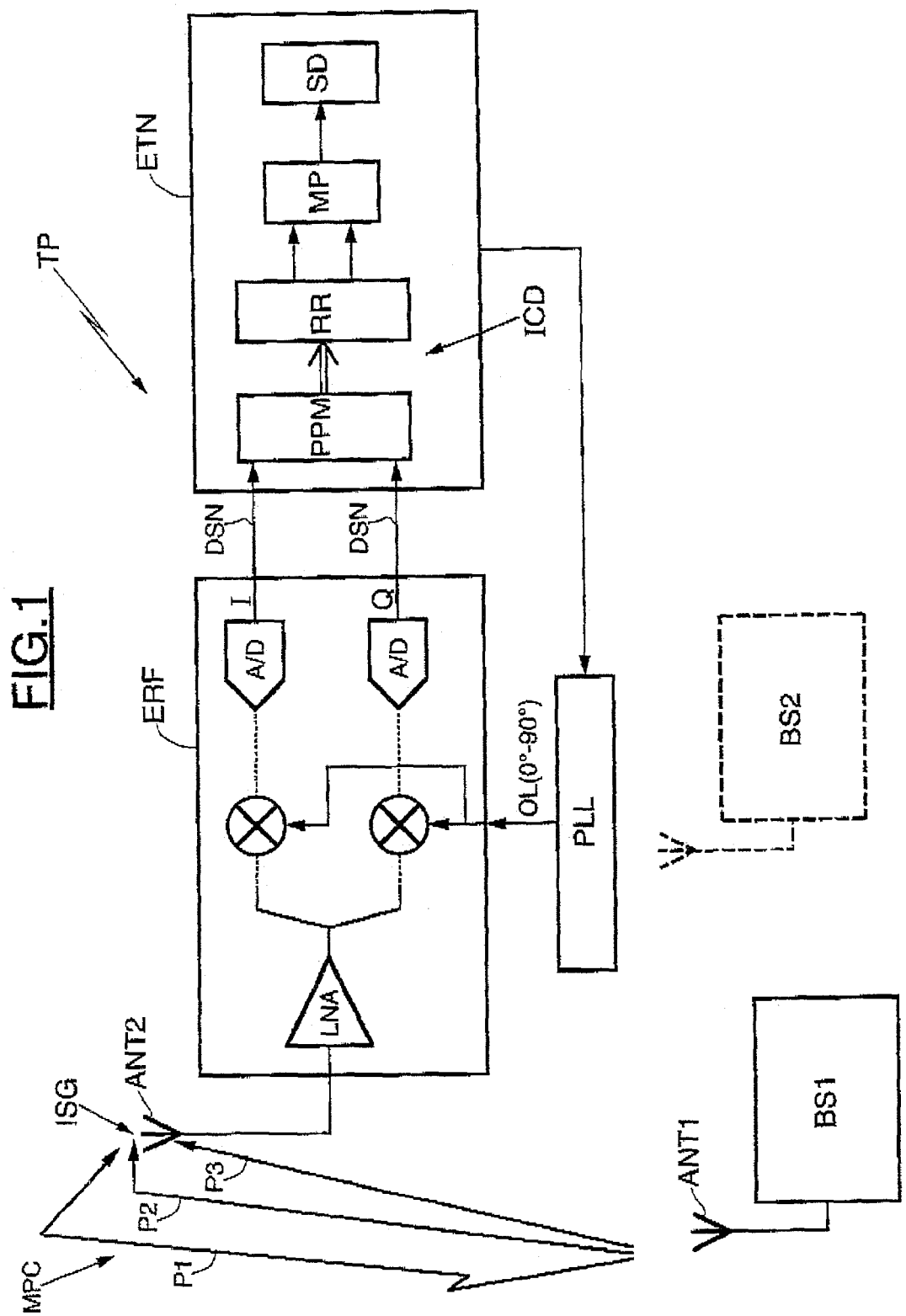
FIG. 1 illustrates very diagrammatically a cellular mobile phone according to the invention incorporating an interference cancellation device according to the invention.

In FIG. 1, the reference TP denotes a remote terminal such as a cellular mobile phone which is in communication with a base station BS1. In this embodiment, the wireless communication system is an UTRA-TDD system, and only the downlink situation will be described.

The mobile phone TP comprises, conventionally, an analog radio frequency front end stage ERF connected to an antenna ANT2 for receiving an input signal ISG.

Conventionally, the stage ERF comprises a low noise amplifier LNA and two processing channels including mixers and conventional filters and amplifiers (not shown). The two mixers receive respectively from a phase locked loop PLL two signals, having mutually a phase difference of 90°. After frequency transposition in the mixers, the two processing channels define respectively two streams I and Q as it is well known by the man skilled in the art. After digital conversion into analog-to-digital converters A/D, the two digital streams I and Q are delivered to a digital processing stage ETN.

This digital stage ETN comprises preprocessing means PPM followed by a Rake receiver RR followed by conventional demapping means MP (demodulation means) which perform the demodulation of the constellation delivered by the Rake receiver. The stage ETN comprises also conventionally a channel decoder and a source decoder SD which performs a source decoding well-known by the man skilled in the art.

Preprocessing means PPM and the Rake receiver RR form together an interference cancellation device ICD according to the invention, The Rake receiver is a conventional one. An example of a Rake receiver may be found in EP 1175019. The Rake receiver is adapted to perform a single user matched filtering. More precisely, each finger of the Rake receiver acts as a correlator matched to a delay on which significant energy arrives; symbols at the output of each finger are phase-adjusted and then combined; channel estimation based on known pilot symbols enables radio channel tracking and fingers parameters update.

At last, as it is also well-known by the man skilled in the art, the phase locked loop PLL is controlled by an automatic frequency control algorithm incorporated in a processor of the stage ETN.

The received signal ISG results from the transmission of an initial signal by the antenna ANT1 of the base station BS1 on a multipath channel transmission MPC. In the present embodiment, it is assumed that the mobile phone TP receives a signal from base station BS1 only. But of course, the received signal ISG could also result from the transmission of initial signals respectively emitted by several different base stations BS1 and BS2.

Because of possible reflections of the signal on obstacles located between the base station BS1 and the mobile phone TP, the transmission channel MPC comprises several different transmission paths (here three paths P1, P2, P3 are shown).

As it is well known by the man skilled in the art, before transmission through the antenna ANT1, the initial signal containing the data (symbols) is scrambled and spread by the processing means of the base station BS1, by using the scrambling code of the base station and the orthogonal code of the phone TP.

Since CDMA is of concern, the data symbol sequence modulated by a QPSK data modulation is spread with a real spreading code. In WCDMA/TDD and more particularly in UTRA-TDD, the utilized codes are the so-called OVSF (Orthogonal Variable Spreading Factor) codes, which will further allow to mix different data rates within one time slot while preserving the orthogonality.

The elements $c_q^{(k)}$; k=1, . . . , K; q=1, . . . , $Q_k$; of the real valued channelisation codes $c^{(k)} = (c_1^{(k)}, c_2^{(k)}, \ldots, c_{Q}^{(k)})$, k=1, . . . , K; shall be taken from the set $V_c = \{1,-1\}$. k is the user index and $Q_k$ denotes the spreading factor of the $k^{th}$ user. The OVSF codes can be defined using the code tree of FIG. 2.

Each level in the code tree defines a spreading factor indicated by the value of Q in the figure. All codes within the code tree cannot be used simultaneously in a given timeslot. A code can be used in a timeslot if and only if no other code on the path from the specific code to the root of the tree or in the sub-tree below the specific code is used in this timeslot. This means that the number of available codes in a slot is not fixed but depends on the rate and spreading factor of each physical channel. The spreading factor goes up to $Q_{MAX}=16$.

The orthogonality property leads to a perfect multiuser interference cancellation, within one propagation path, since code sequences are synchronized in this case.

The spreading of data by a real valued channelisation code $c^{(k)}$ of length $Q_k$ is followed by a cell specific complex scrambling sequence $\underline{i} = (\underline{i}_1, \underline{i}_2, \ldots, \underline{i}_{16})$. The elements $\underline{i}_i$; i= 1, . . . , 16 of the complex valued scrambling codes shall be taken from the complex set $\underline{V}_v = \{1, j, -1, -j\}$.

Consequently, the symbols are transformed into chips having a predetermined length Tc (for example equal to 260 ns), corresponding to a predetermined chip rate (of 3.84 Mcps for example). The chip rate is greater than the data or symbol rate. For example, one symbol can be transformed into 4 to 256 chips.

The initial signal constituted of chips is then filtered in a matched filter before analog conversion and transmission through antenna ANT1.

After analog-to-digital conversion in the A/D converters of the phone TP, the signal (complex signal constituted of the two streams I and Q) is a digital scrambled and spreaded signal constituted of chips, oversampled with an oversampling factor Ns (Ns=4 for example). This digital signal DSN includes delayed versions of the initial scrambled and spread signal transmitted by the base station.

Figure 3:
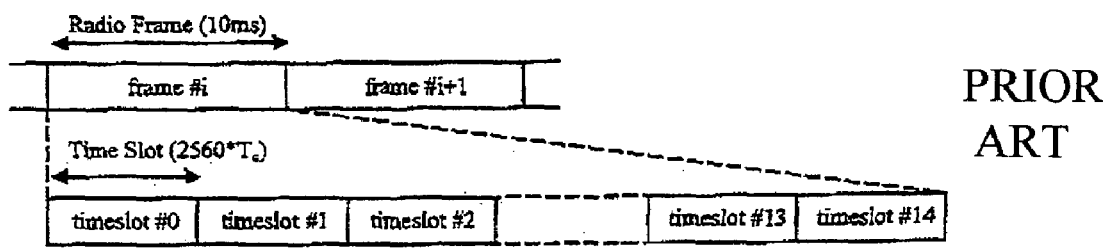
FIG. 3 illustrates a physical channel signal format.

All physical channels take a structure of radio frames, and timeslots. Timeslots add a TDMA component, which allows to separate different users in the time in addition to the code domain. Each frame includes 15 timeslots. Each timeslot is a sequence of 2560 chips. The structure appears on FIG. 3.

Figure 4:
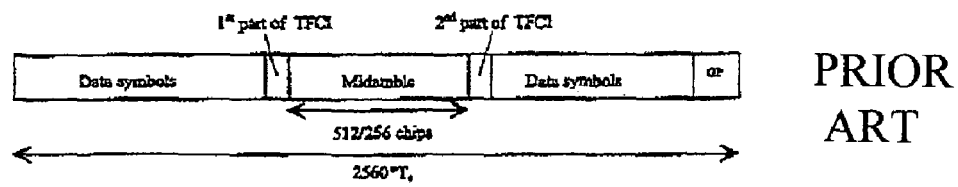
FIG. 4 illustrates a timeslot format.

Each timeslot comprises two data parts, separated by a midamble, which acts as a training sequence (FIG. 4). GP denotes the guard period, which is needed to compensate the propagation delay. TFCI stands for Transport Format Combination Indicator and is used to inform the receiver about the instantaneous parameters of the different transport channels multiplexed onto one physical channel. If power control is applied, the TPC (Transmit Power Control) field carries commands to adjust the transmission power. A physical channel is defined by carrier frequency, timeslot, channelisation code (or spreading code), burst type, repetition period, superframe offset and repetition length.

In the following, the term "user" denotes more generally a WCDMA physical channel with its own spreading code.

Figure 5:
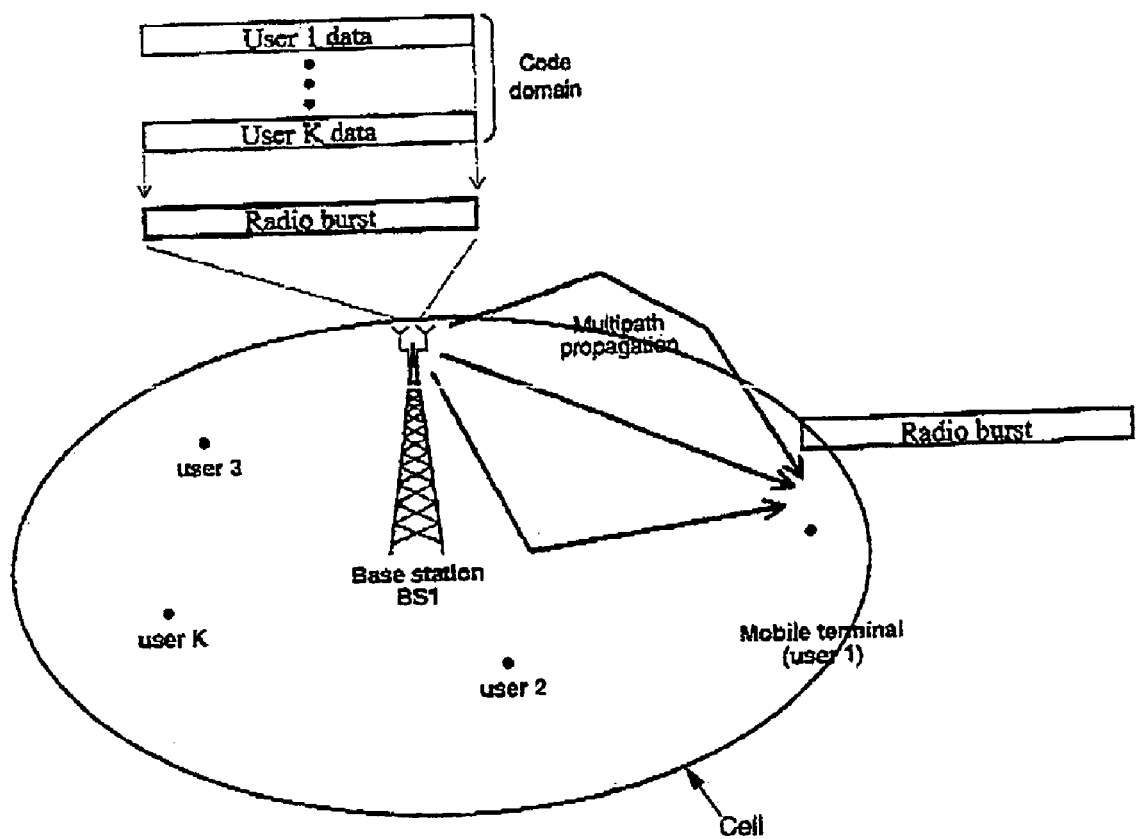
FIG. 5 illustrates a downlink transmission situation.

Further, as illustrated on FIG. 5, a typical downlink situation has been considered. The base station BS1 transmits data to K users within the serving cell. Since CDMA is of concern, the physical channels (users) are multiplexed by the base station and sent synchronously within a burst and travel accross the same wireless channel up to the user of interest (user 1 in the present case).

Further, in the, following, the data symbol vector $$\vec{d}^{(k)} = \begin{bmatrix} d_1^{(k)} \\ \vdots \\ d_N^{(k)} \end{bmatrix}$$

represents the data sent by user k during one burst (N QPSK symbols). The midamble is not considered and the N symbols are contituted by the N/2 symbols of each data part.

The code of the $k^{th}$ user combines spreading and scrambling, and is a set of Q complex QPSK symbols, $\{c_1^{(k)}, \ldots, c_Q^{(k)}\}$, where Q is the spreading length.

The channel impulse response of the wireless channel is modeled for each user by the vector $$\vec{h}^{(k)} = \begin{bmatrix} h_1^{(k)} \\ \vdots \\ h_W^{(k)} \end{bmatrix}.$$

The channel length is equal to W chips. The superscript k could in fact be removed, since the downlink situation is addressed. The channel is assumed to remain unchanged over one burst duration, which is generally true for moderate terminal velocities.

The response of the wireless channel to the $k^{th}$ user's spreading sequence is: $b^{(k)} = c^{(k)} * h^{(k)}$, which can be written in a matrix vector form:

$$\begin{bmatrix} b_1^{(k)} \\ b_2^{(k)} \\ b_3^{(k)} \\ \vdots \\ \vdots \\ \vdots \\ b_{Q+W-1}^{(k)} \end{bmatrix} = \begin{bmatrix} c_1^{(k)} & 0 & 0 & 0 \\ c_2^{(k)} & c_1^{(k)} & 0 & 0 \\ \vdots & c_2^{(k)} & \ddots & 0 \\ c_Q^{(k)} & \vdots & \vdots & c_1^{(k)} \\ 0 & c_Q^{(k)} & \vdots & c_2^{(k)} \\ 0 & 0 & \ddots & \vdots \\ 0 & 0 & 0 & c_Q^{(k)} \end{bmatrix} \cdot \begin{bmatrix} h_1^{(k)} \\ h_2^{(k)} \\ \vdots \\ h_W^{(k)} \end{bmatrix}$$

The data symbol $d_j^{(k)}$ (scalar quantity) is sent through the wireless channel as follows: $(d_j^{(k)} \cdot c^{(k)}) * h^{(k)} = d_j^{(k)} \cdot (c^{(k)} * h^{(k)}) = d_j^{(k)} \cdot b^{(k)}$ The transmission of the whole data burst can be expressed using the A matrix defined below, for K=2 users.

$$\begin{bmatrix} r_1 \\ r_2 \\ \vdots \\ \vdots \\ \vdots \\ \vdots \\ \vdots \\ \vdots \\ \vdots \\ \vdots \\ \vdots \\ \vdots \\ \vdots \\ \vdots \\ r_{NQ+W-1} \end{bmatrix} = \begin{bmatrix} b_1^{(1)} & 0 & 0 & 0 & b_1^{(2)} & 0 & 0 & 0 \\ b_2^{(1)} & 0 & 0 & 0 & b_2^{(2)} & 0 & 0 & 0 \\ \vdots & 0 & 0 & 0 & \vdots & 0 & 0 & 0 \\ b_{Q+1}^{(1)} & b_1^{(1)} & 0 & 0 & b_{Q+1}^{(2)} & b_1^{(2)} & 0 & 0 \\ \vdots & b_2^{(1)} & 0 & 0 & \vdots & \vdots & 0 & 0 \\ b_{Q+W-1}^{(1)} & \vdots & 0 & 0 & b_{Q+W-1}^{(2)} & \vdots & 0 & 0 \\ 0 & \vdots & b_1^{(1)} & 0 & 0 & \vdots & b_1^{(2)} & 0 \\ 0 & \vdots & \vdots & 0 & 0 & \vdots & \vdots & 0 \\ 0 & b_{Q+W-1}^{(1)} & \vdots & 0 & 0 & b_{Q+W-1}^{(2)} & \vdots & 0 \\ 0 & 0 & \vdots & b_1^{(1)} & 0 & 0 & \vdots & b_1^{(2)} \\ 0 & 0 & \vdots & \vdots & 0 & 0 & \vdots & \vdots \\ 0 & 0 & b_{Q+W-1}^{(1)} & \vdots & 0 & 0 & b_{Q+W-1}^{(2)} & \vdots \\ 0 & 0 & 0 & \vdots & 0 & 0 & 0 & \vdots \\ 0 & 0 & 0 & \vdots & 0 & 0 & 0 & \vdots \\ 0 & 0 & 0 & b_{Q+W-1}^{(1)} & 0 & 0 & 0 & b_{Q+W-1}^{(2)} \end{bmatrix} \cdot \begin{bmatrix} d_1^{(1)} \\ \vdots \\ d_N^{(1)} \\ d_1^{(2)} \\ \vdots \\ d_N^{(2)} \end{bmatrix} + \begin{bmatrix} n_1 \\ n_2 \\ \vdots \\ \vdots \\ \vdots \\ \vdots \\ \vdots \\ \vdots \\ \vdots \\ \vdots \\ \vdots \\ \vdots \\ \vdots \\ \vdots \\ n_{NQ+W-1} \end{bmatrix}$$

The noise vector is assumed to be uncorrelated Gaussian noise. The received burst can then be written as:

$$r = A \cdot d + n = [A_1, A_2] \cdot \begin{bmatrix} d^{(1)} \\ d^{(2)} \end{bmatrix} + n$$

where $A_1$ and $A_2$ denote the-contributions of users 1 and 2 respectively. The situation can easily be generalized to K simultaneous users, with A and d given below:

$$A = [A_1, A_2, \ldots, A_K] \quad d = \begin{bmatrix} d^{(1)} \\ \vdots \\ d^{(K)} \end{bmatrix}$$

$$r = A \cdot d + n = [A_1, \ldots, A_K] \cdot \begin{bmatrix} d^{(1)} \\ \vdots \\ d^{(K)} \end{bmatrix} + n$$

Another useful representation for the A burst transmission matrix is the one where the user contributions are gathered inside the same block. Then, adjacent blocks correspond to different symbols. This of course requires a reordering within the data vector d.

The structure of such a burst transmission matrix A is defined below, for K=2 users:

$$\begin{bmatrix} r_1 \\ r_2 \\ \vdots \\ \vdots \\ \vdots \\ \vdots \\ \vdots \\ \vdots \\ \vdots \\ \vdots \\ \vdots \\ \vdots \\ \vdots \\ r_{NQ+W-1} \end{bmatrix} = \begin{bmatrix} b_1^{(1)} & b_1^{(2)} & 0 & 0 & 0 & 0 & 0 & 0 \\ b_2^{(1)} & b_2^{(2)} & 0 & 0 & 0 & 0 & 0 & 0 \\ \vdots & \vdots & 0 & 0 & 0 & 0 & 0 & 0 \\ b_{Q+1}^{(1)} & b_{Q+1}^{(2)} & b_1^{(1)} & b_1^{(2)} & 0 & 0 & 0 & 0 \\ \vdots & \vdots & b_2^{(1)} & b_2^{(2)} & 0 & 0 & 0 & 0 \\ b_{Q+W-1}^{(1)} & b_{Q+W-1}^{(2)} & \vdots & \vdots & 0 & 0 & 0 & 0 \\ 0 & 0 & b_{Q+1}^{(1)} & b_{Q+1}^{(2)} & b_1^{(1)} & b_1^{(2)} & 0 & 0 \\ 0 & 0 & \vdots & \vdots & b_2^{(1)} & b_2^{(2)} & 0 & 0 \\ 0 & 0 & b_{Q+W-1}^{(1)} & b_{Q+W-1}^{(2)} & \vdots & \vdots & 0 & 0 \\ 0 & 0 & 0 & 0 & b_{Q+1}^{(1)} & b_{Q+1}^{(2)} & b_1^{(1)} & b_1^{(2)} \\ 0 & 0 & 0 & 0 & \vdots & \vdots & b_2^{(1)} & b_2^{(2)} \\ 0 & 0 & 0 & 0 & b_{Q+W-1}^{(2)} & b_{Q+W-1}^{(2)} & \vdots & \vdots \\ 0 & 0 & 0 & 0 & 0 & 0 & b_{Q+1}^{(1)} & b_{Q+1}^{(2)} \\ 0 & 0 & 0 & 0 & 0 & 0 & \vdots & \vdots \\ 0 & 0 & 0 & 0 & 0 & 0 & b_{Q+W-1}^{(1)} & b_{Q+W-1}^{(2)} \end{bmatrix} \cdot \begin{bmatrix} d_1^{(1)} \\ d_1^{(2)} \\ d_2^{(1)} \\ d_2^{(2)} \\ \vdots \\ \vdots \\ d_N^{(1)} \\ d_N^{(2)} \end{bmatrix} + \begin{bmatrix} n_1 \\ n_2 \\ \vdots \\ \vdots \\ \vdots \\ \vdots \\ \vdots \\ \vdots \\ \vdots \\ \vdots \\ \vdots \\ \vdots \\ \vdots \\ n_{NQ+W-1} \end{bmatrix}$$

Figures 6, 7:
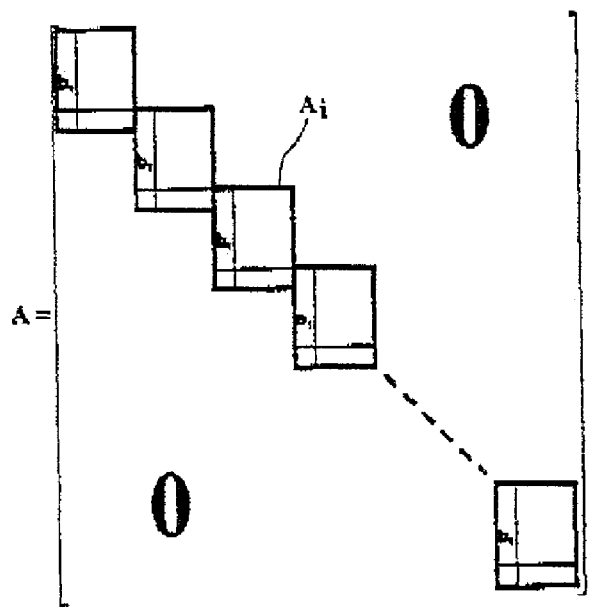
FIG. 6 illustrates a structure of the A matrix (in a user/symbol form)
FIG. 7 illustrates a structure of the $A_i$ blocks of the A matrix of FIG. 6.

For K users, it can be generalized as illustrated on FIG. 6 where $A_i$ is illustrated on FIG. 7.

A is a not a block diagonal matrix (block are placed every Q rows), but the blocks are overlapping together, due to multipath propagation, which leads to inter-symbol interference. However, in the sense of the present invention, A is nevertheless called a "block matrix".

Since the wireless channel is assumed to remain constant over one burst duration, and since the spreading codes do not change from one symbol to another, the blocks $A_i$ within the A burst transmission matrix are all identical.

The main idea to reject the multiple access interference, or at least part of it, is to use a projection based approach. The received signal r (at the chip level) is made of a useful part $r_1$, i.e. the data of interest (i.e. user 1's data), the data of other users $r_i$, which causes interference, and the noise term n:

$$r = r_1 + r_i + n$$

The final aim is to reduce as much as possible the $r_i$ component, without requiring the explicit detection of the corresponding data. The cancellation process is "blind" in that sense. This can be performed following the procedure below:

1. Find a basis which spans the interfering signal space
2. Build a basis that spans the space orthogonal to the one in 1
3. Project the received signal onto the space defined in 2
4. Feed the resulting signal to a conventional Rake receiver
5. Detect the data of user 1

Figure 8:
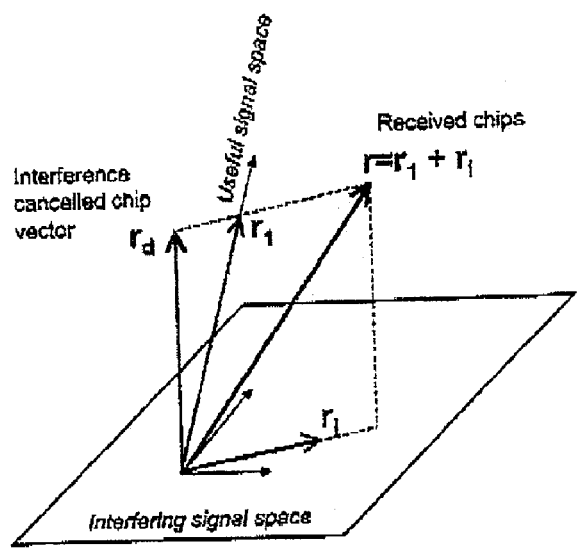
FIG. 8 depicts a geometrical interpretation of the invention.

The geometrical interpretation is depicted in FIG. 8.

1) The useful signal lies in a vector space spanned by the columns of A corresponding to user 1 (those which contain $b^{(1)}$).
2) The interfering signal space is spanned by the remaining columns of A (containing $b^{(2)}, \ldots, b^{(k)}$).

The projection method entirely removes the interfering part $r_i$ from the received vector of chips r. But it also subtracts part of the useful signal $r_1$, since the useful and the interfering spaces are not orthogonal, due to multipath propagation. Nevertheless, this energy loss is largely compensated by the removed amount of multiple access interference.

Then a projection matrix M is built, which spans the orthogonal complement of the interfering signal space, in the following way:

$$M = I - A_I(A_I^H A_I)^{-1} A_I^H$$

where the columns of the interfering burst transmission matrix $A_I$ span the interfering space. The notation "H" means "hermitian transpose".

Then, the received burst r is processed as follows: $\bar{r}_c = M \cdot \bar{r}$, where $r_c$ is the cancelled or projected vector of chips. As mentioned before, the multiple access interference is perfectly removed, provided that a description of the interfering signal space is known (i.e. the knowledge of the codes in use and of the channel impulse response), which is the case in such a wireless communication system.

The cancellation process is "blind" in the sense that the interfering data is not explicitly detected.

To finish with, the cancelled vector is passed through the Rake receiver RR matched to user 1, in order to estimate its data symbols:

$$\bar{a}_1 = A_1^H \bar{r}_c$$

Figure 9:
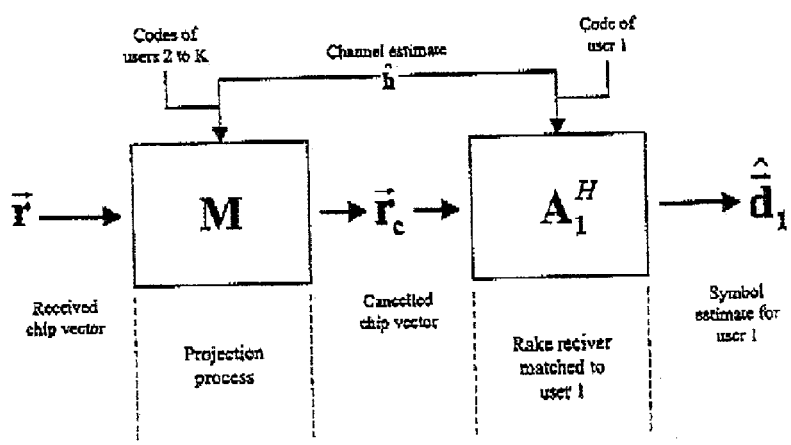
FIG. 9 illustrates diagrammatically a projection based interference cancellation process according to the invention.

The whole cancellation procedure is summarized in FIG. 9.

As such, this projection based approach can be too complex in order to be implemented in a real-time fashion in some types of mobile terminals, as cellular mobile phones.

Thus, according to a preferred embodiment of the invention, a symbol by symbol processing technique can provide with a major complexity reduction.

More precisely, the previous projection matrix computation considered the complete interfering burst transmission matrix $A_i$, i.e. over the whole burst duration. After a closer look at the inner structure of $A_i$, such an approach can be avoided, given the fact that the delay spread introduced by the wireless channel is limited. It is sufficient to consider only three consecutive blocks within $A_i$, provided that the delay spread remains smaller than the spreading factor Q.

Therefore, the projection matrix M is computed from 3 consecutive blocks of the interfering burst transmission matrix, where as usual, only columns related to the interferers are taken into account. The cancellation is now done in N steps (N=number of symbols), one symbol after another. Then, the cancelled symbol is passed through the Rake receiver matched to user 1. The process is illustrated in 10 and FIG. 11.

The man skilled in the art can note that, at each step, one projection matrix is computed from three consecutive blocks and it describes the orthogonal subspace to the signal space spaned by three consecutive interfering symbols. With such sliding window processing, the complexity is reduced since the matrix to be inverted has a smaller size than the one to be inverted when the whole burst is considered.

Generally speaking, each computed block of the burst interference transmission matrix comprises a number of columns equal to the number of CDMA interfering physical channels (interfering users) within the burst, and a number of rows directly depending from the spreading factors Q of the interfering users (and depending also on the length considered for the channel impulse responses).

Interference cancellation as previously considered was done at the interfering symbol rate, i.e. said projection phase and said filtering phase were done in N steps.

That means that the specific codes allocated to each CDMA interfering physical channels have directly been used in order to compute a projection matrix.

However, it is possible again to reduce the complexity by higher level projections.

Figure 2:
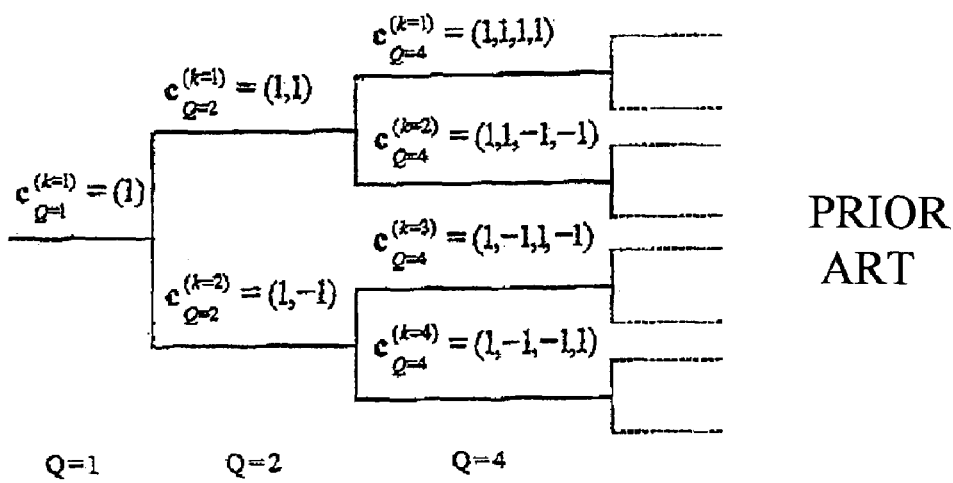
FIG. 2 illustrates a code-tree for generation of Orthogonal Variable Spreading Factor (OVSF) codes for channelisation operation.

In that sense, the specific structure of the OVSF code tree as illustrated in FIG. 2, can be exploited given the following facts:

1) Each code at a given level (spreading factor $Q_1$) within the tree is used to construct 2 child codes at the next level (spreading factor $Q_2 = 2 \cdot Q_1$).

2) Each child code is obtained by the concatenation of its parent code, multiplied by +1 or −1.

And, considering now that at least two CDMA interfering physical channels have specific codes associated with spreading factors and corresponding to a same parent code associated with a parent spreading factor PQ, each computed block of the burst interference transmission matrix comprises a number of rows directly depending on said parent spreading factor. And, in that case, said projecting phase and said filtering phase are done in pN steps, p being equal to Q/PQ.

In that case, said projecting and filtering phases are done step by step during each reception of a burst at a rate which is equal to an integer multiple of the symbol rate.

More precisely and for example, one interferer with Q=16 can be seen as a fictitious double rate user with Q=8, with twice the number of symbols. The spreading factor used for cancellation purposes can thus be set to 8, using the parent code of the interfering code. Furthermore, if two interferers (with spreading factor Q) have the same parent code, they can be both cancelled using a single code with Q/2. Hence the number of interfering codes is artificially reduced by 2. Similarly, up to four users with Q=16 can be cancelled using the generating code with spreading factor 4.

Generally, the specific code is the combination of a spreading code and of a scrambling code. More precisely, the scrambling operation comes after spreading and consists in a chip by chip multiplication of the spread data with a scrambling code.

When the respective lengths of the spreading code and the scrambling code are equal, each sliding window, in the sliding window approach contains the same blocks. In other words, the blocks are identical from one sliding window to another.

However, a problem arises when spreading and scrambling lengths differ. This occurs in particular in the UTRA-TDD system, in which the scrambling length is equal to 16 chips whereas the spreading factors can be equal to 1 or 16. Spreading factors equal to 2, 4, or 8 can also be used theoretically but they are for the time being not used practically in a TDD system.

In that case, at least two consecutive sliding windows contain different blocks.

More precisely, the fact that the lengths of the scrambling code and of the spreading code are different, induces a periodically time varying spreading code and blocks within the burst interfering transmission matrix, also alternate periodically. Thus, with the sliding window approach, two different projection matrices have to be computed at each step when the spreading factor is equal to 8, whereas four projection matrices have to be computered when the spreading factor is equal to 4, and so on (16 projection matrices have to be computed when the spreading factor is equal to 1).

While the above description contains certain specifications, this should not construe as limitations on the scope of the invention but rather an exemplification of one preferred embodiment and application thereof. It will be apparent to those skilled in the art that various modifications can be made to the invention without departing from the scope or spirit of the invention and it is intended that the present invention covers modifications and variations of the interference cancellation method and device provided they come in the scope of the appended claims and their equivalence.

For example, the invention can also be deployed in a FDD based system and for the future High Speed Packet Down Link (HSPDA) mode of the 3GPP standard.

Further, although only the downlink situation has been described in details, the invention can be applied to the uplink situation as well, using different channels impulse responses for the users.

Further, this projection based approach according to the invention can also be employed to suppress interfering signals from other cells (other base stations). However, some modifications are needed, which can be easily be made by the man skilled in the art. For example a basis for these interfering signals must first be built.

What is claimed is:

1. Method of interference cancellation in a Code Division Multiple Access (CDMA) wireless communication system the method comprising the steps of:
   receiving an incident digital signal containing a user signal transmitted on a CDMA user physical channel and an interfering signal;
   projecting said incident digital signal onto a projection space orthogonal to the space containing said interfering signal; and
   filtering said projected signal with a filter matched to the CDMA user physical channel for detecting the data contained in said user signal,
   wherein said interfering signal contains interfering information transmitted on at least one CDMA interfering physical channel,
   the data transmitted on each CDMA physical channel are sent burst by burst, each burst comprising N data symbols,
   channel coefficients and a specific code are allocated to each physical CDMA channel during each burst, and
   the projecting step comprises the sub-steps of:
      determining a burst interfering transmission matrix representative of said interfering signal space and containing information on channel coefficients and specific codes of all the CDMA interfering physical channels in use during said burst transmission;
      determining said projection matrix from said burst interfering transmission matrix; and
      multiplying said projection matrix with the N symbols of the received burst wherein N is an integer.

2. Method according to claim 1,
   wherein the determining step comprises determining a burst transmission matrix containing information on channel coefficients and specific codes in use during said burst transmission, said burst transmission matrix comprising columns corresponding to said CDMA user physical channel, and remaining columns, and
   said remaining columns are the columns of said burst interfering transmission matrix.

3. Method according to claim 1, wherein said projecting and filtering steps are done during each reception of a burst at a rate which is equal to the symbol rate or an integer multiple thereof.

4. Method according to claim 3,
   wherein said burst interference transmission matrix is a block matrix, and
   at each current step:
      a current sliding window of at least three consecutive blocks of the burst interference transmission matrix is used,
      one projection matrix is computed from said current sliding window of at least three consecutive blocks,
      a part of the received burst comprising at least three consecutive symbols is multiplied with said one projection matrix, and
      the corresponding projected part of the burst is filtered with said filter matched to the CDMA user physical channel.

5. Method according to claim 4,
   wherein the specific code allocated to a CDMA physical channel comprises a set of Q code symbols, Q being a spreading factor,
   the CDMA physical channels are sent across a CDMA wireless channel which is a multipath channel introducing a delay spread smaller than the smallest spreading factor, and
   the number of consecutive blocks is equal to three wherein Q is an integer.

6. Method according to claim 4,
   wherein each computed block of the burst interference transmission matrix comprises a number of columns equal to the number of CDMA interfering physical channels within the burst, and a number of rows directly depending on the spreading factors Q of the CDMA interfering physical channels, and
   said projecting step and said filtering step are done in N steps wherein Q is an integer.

7. Method according to claim 4,
   wherein each specific code allocated to each CDMA interfering physical channel belongs to a code tree with each code at a given level within the tree being used to construct two child codes at the next level, each child code being obtained by the concatenation of its parent code, multiplied by +1 or −1,
   at least two CDMA interfering physical channels have specific codes associated with spreading factors and corresponding to a same parent code associated with a parent spreading factor PQ,
   each computed block of the burst interference transmission matrix comprises a number of columns smaller than the number of CDMA interfering physical channels within the burst, and a number of rows directly depending of on said parent spreading factor, and
   said projecting step and said filtering step are done in pN steps, p being equal to Q/PQ, wherein Q being a separate factor and further Q and PQ are integers.

8. Method according to claim 4,
   wherein the specific code is the combination of a spreading code and a scrambling code,
   the respective lengths of the spreading code and the scrambling code are equal, and
   each sliding window contains the same blocks.

9. Method according to claim 4,
   wherein the specific code is the combination of a spreading code and a scrambling code,
   the length of the spreading code is smaller than the length of the scrambling code, and
   at least two consecutive sliding windows contain different blocks.

10. Method according to claim 1,
    wherein the CDMA wireless communication system is an Universal Mobile Telecommunications System (UMTS) Terrestrial Radio Access-time Division Duplex (UTRA-TDD) wireless communication system, and
    the incident signal is emitted by a base station.

11. Interference cancellation device for a Code Division Multiple Access (CDMA) wireless communication system the device comprising:
    reception means for receiving an incident digital signal containing a user signal transmitted on a CDMA user physical channel and an interfering signal;

preprocessing means for projecting said incident digital signal onto a projection space orthogonal to the space containing said interfering signal; and a Rake receiver connected to the output of the preprocessing means, and matched to the CDMA user physical channel for detecting the data contained in said user signal, wherein said interfering signal contains interfering information transmitted on at least one CDMA interfering physical channel, the data transmitted on each CDMA physical channel are sent burst by burst, each burst comprising N data symbols, channel coefficients and a specific code are allocated to each physical CDMA channel during each burst, and the preprocessing means comprises:
   first calculation means for determining a burst interfering transmission matrix representative of said interfering signal space and containing information on channel coefficients and specific codes of all the CDMA interfering physical channels in use during said burst transmission;
   second calculation means for determining said projection matrix from said burst interfering transmission matrix; and
   multiplication means for multiplying said projection matrix with the N symbols of the received burst wherein N is an integer.

12. Device according to claim 11,
wherein said first calculation means comprises means for determining a burst transmission matrix containing information on channel coefficients and specific codes in use during said burst transmission, said burst transmission matrix comprising columns corresponding to said CDMA user physical channel, and remaining columns, and said remaining columns are the columns of said burst interfering transmission matrix.

13. Device according to claim 11, wherein said preprocessing means and said Rake receiver perform the projecting and filtering during each reception of a burst at a rate which is equal to the symbol rate or an integer multiple thereof.

14. Device according to claim 13,
wherein said burst interference transmission matrix is a block matrix, and at each current step:
   the preprocessing means uses a current sliding window of at least three consecutive blocks of the burst interference transmission matrix, computes one projection matrix from said current sliding window of at least three consecutive blocks, and multiplies a part of the received burst comprising three consecutive symbols with said one projection matrix, and
   the Rake receiver filters the corresponding projected part of the burst.

15. Device according to claim 14,
wherein the specific code allocated to a CDMA physical channel comprises a set of Q code symbols, Q being a spreading factor, the CDMA physical channels are sent across a CDMA wireless channel which is a multipath channel introducing a delay spread smaller than the smallest spreading factor, and the number of consecutive blocks is equal to three wherein Q is an integer.

16. Device according to claim 14,
wherein each computed block of the burst interference transmission matrix comprises a number of columns equal to the number of CDMA interfering physical channels within the burst, and a number of rows directly depending on the spreading factors Q of the CDMA interfering physical channels, and said preprocessing means and said Rake receiver perform the projecting and filtering in N steps wherein Q is an integer.

17. Device according to claim 14,
wherein each specific code allocated to each CDMA interfering physical channel belongs to a code tree with each code at a given level within the tree being used to construct two child codes at the next level, each child code being obtained by the concatenation of its parent code, multiplied by +1 or −1, at least two CDMA interfering physical channels have specific codes associated with spreading factors and corresponding to a same parent code associated with a parent spreading factor PQ, each block of the burst interference transmission matrix comprises a number of columns smaller than the number of CDMA interfering physical channels within the burst, and a number of rows directly depending on said parent spreading factor, and said preprocessing means and said Rake receiver perform the projecting and filtering in pN steps, p being equal to Q/PQ, wherein Q being a spreading factor and further Q and PQ are integers.

18. Device according to claim 14,
wherein the specific code is the combination of a spreading code and a scrambling code, the respective lengths of the spreading code and the scrambling code are equal, and each sliding window contains the same blocks.

19. Device according to claim 14,
wherein the specific code is the combination of a spreading code and a scrambling code, the length of the spreading code is smaller than the length of the scrambling code, and at least two consecutive sliding windows contain different blocks.

20. Device according to claim 11, wherein the CDMA wireless communication system is an Universal Mobile Telecommunications System (UMTS) Terrestrial Radio Access-time Division Duplex (UTRA-TDD) wireless communication system.

21. Receiver of a CDMA wireless communication system, the receiver comprising a device according to claim 11.

22. Receiver according to claim 21, wherein the receiver is a cellular mobile phone.

23. Base station of a CDMA wireless communication system, the base station comprising a device according to claim 11.

* * * * *